United States Patent [19]

Durham

[11] Patent Number: 4,549,044

[45] Date of Patent: Oct. 22, 1985

[54] REMOTE TELEMETRY UNIT

[75] Inventor: Stephen J. Durham, Cupertino, Calif.

[73] Assignee: Cermetek Microelectronics, Inc., Sunnyvale, Calif.

[21] Appl. No.: 539,568

[22] Filed: Oct. 6, 1983

[51] Int. Cl.⁴ ............................................. H04M 11/04
[52] U.S. Cl. ................................ 179/5 R; 179/2 AM
[58] Field of Search ........... 179/5 R, 5 P, 2 A, 2 AM

[56] References Cited

U.S. PATENT DOCUMENTS

| 4,086,434 | 4/1978 | Bocchi | 179/5 R X |
| 4,162,488 | 7/1979 | Silverman et al. | 179/5 R X |
| 4,241,237 | 12/1980 | Paraskevakos et al. | 179/2 AM |
| 4,284,849 | 8/1981 | Anderson et al. | 179/5 R |
| 4,394,540 | 7/1983 | Willis et al. | 179/2 AM |
| 4,415,774 | 11/1983 | Driver . | |
| 4,436,956 | 3/1984 | Schreiber . | |

Primary Examiner—Keith E. George
Attorney, Agent, or Firm—Thomas E. Schatzel

[57] ABSTRACT

A remote-telemetry unit for monitoring and reporting to a remote location over a telephone line the condition of an associated piece of equipment at predetermined times, when polled and when the equipment condition dictates, the unit including a direct access arrangement, a switched-frequency Friend Biquad type filter and a detector, the combination for detecting tone signals developed on the line, and a digital-to-analog converter and a controller, in combination with the direct access arrangement for developing on the line tone signals for dialing and for condition reporting.

8 Claims, 6 Drawing Figures

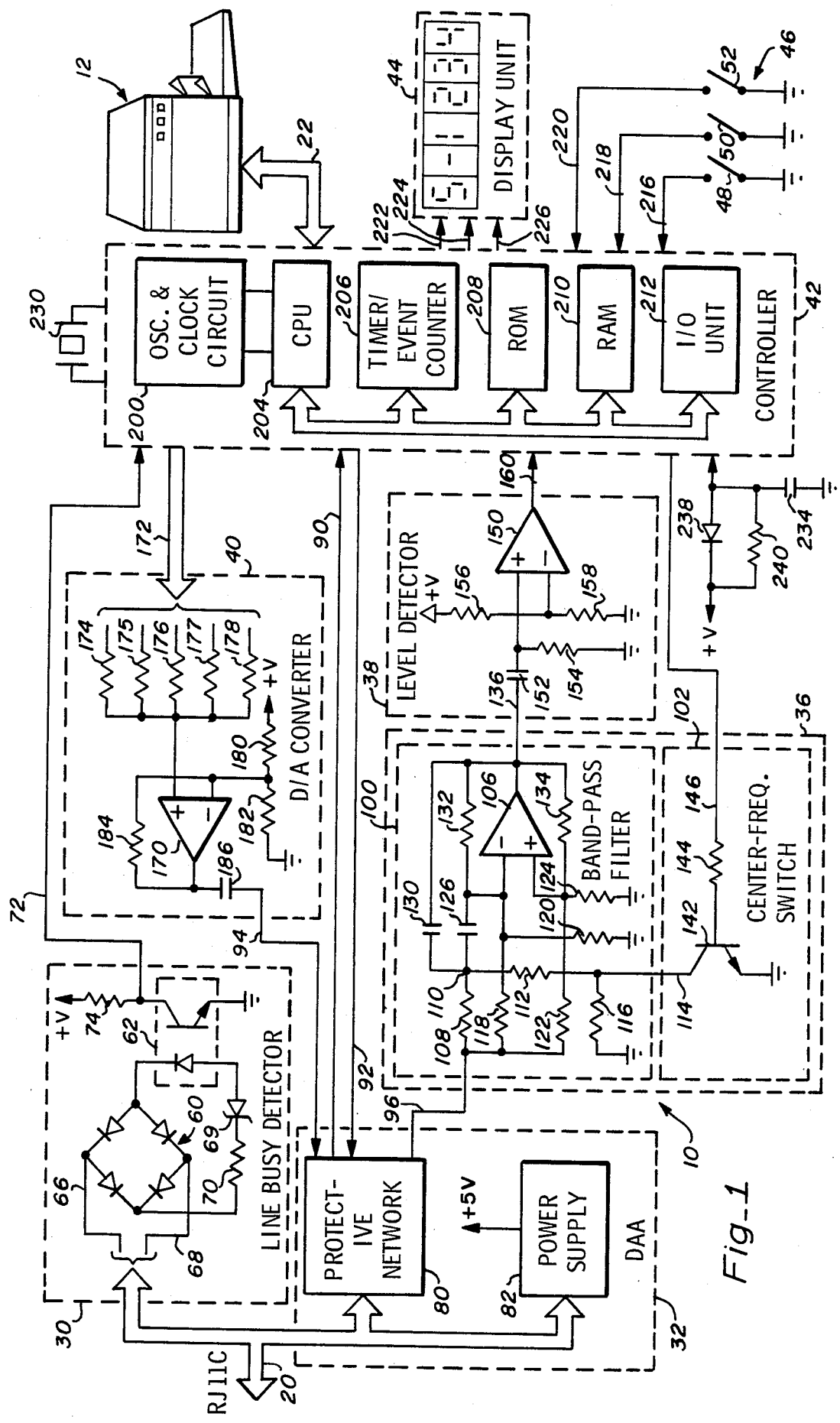
Fig_1

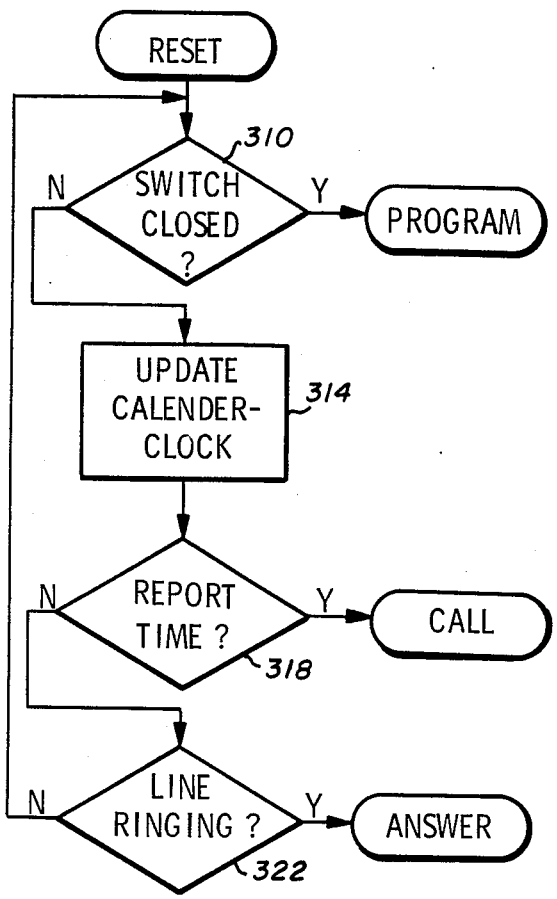
Fig_2A
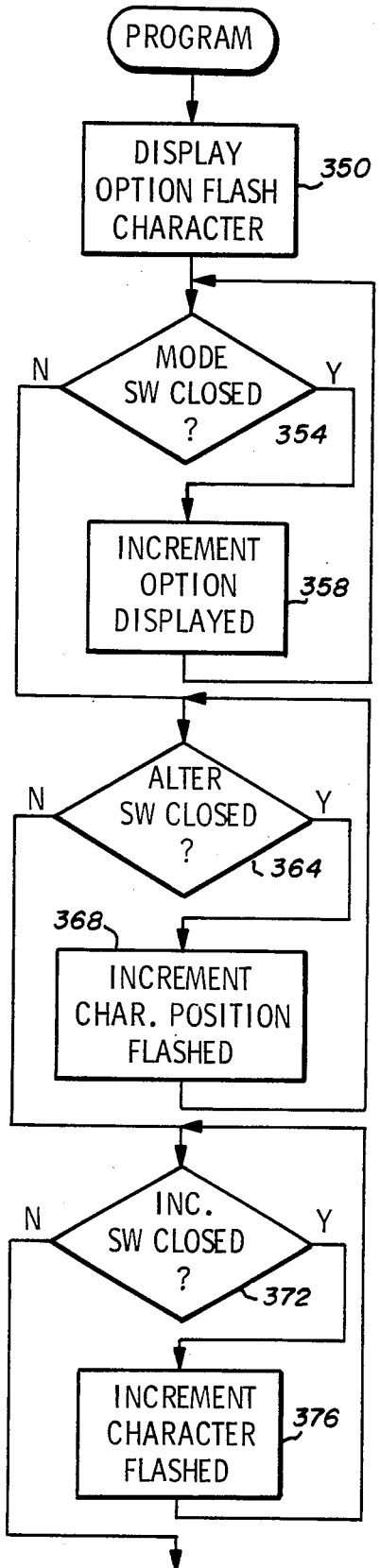
Fig_2B

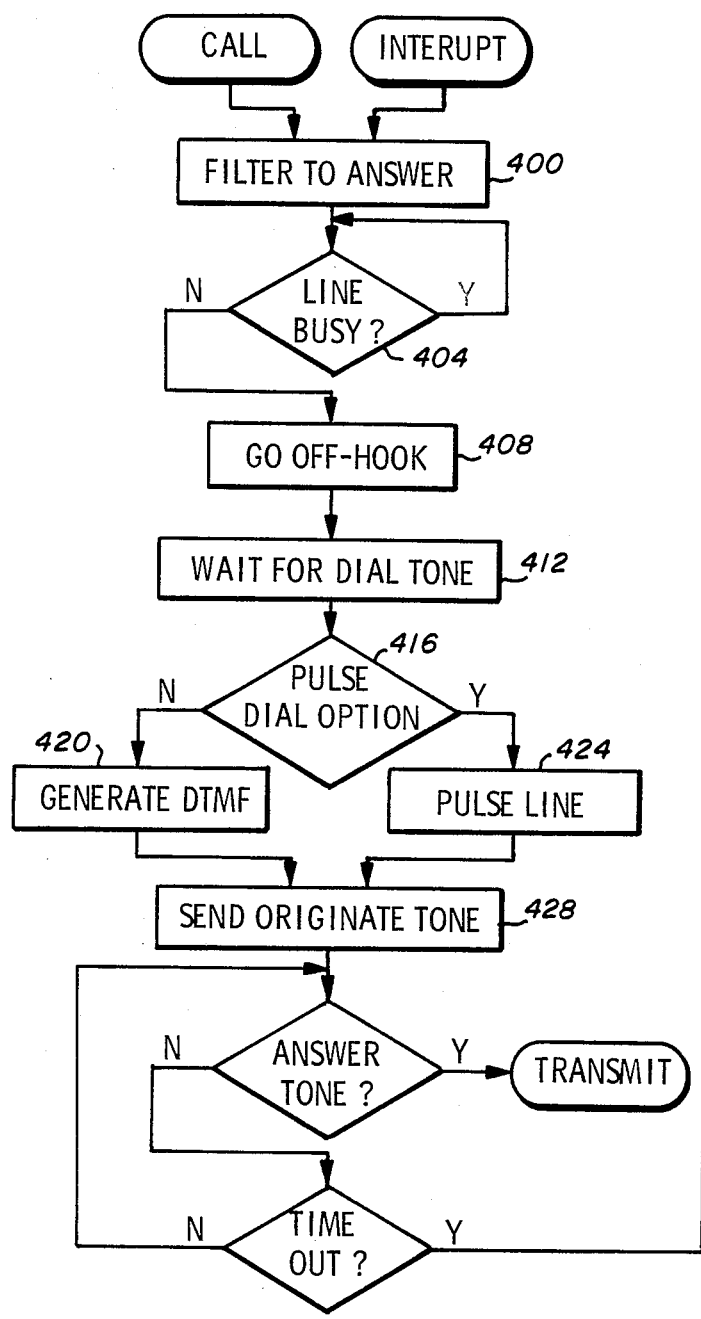
Fig_2C
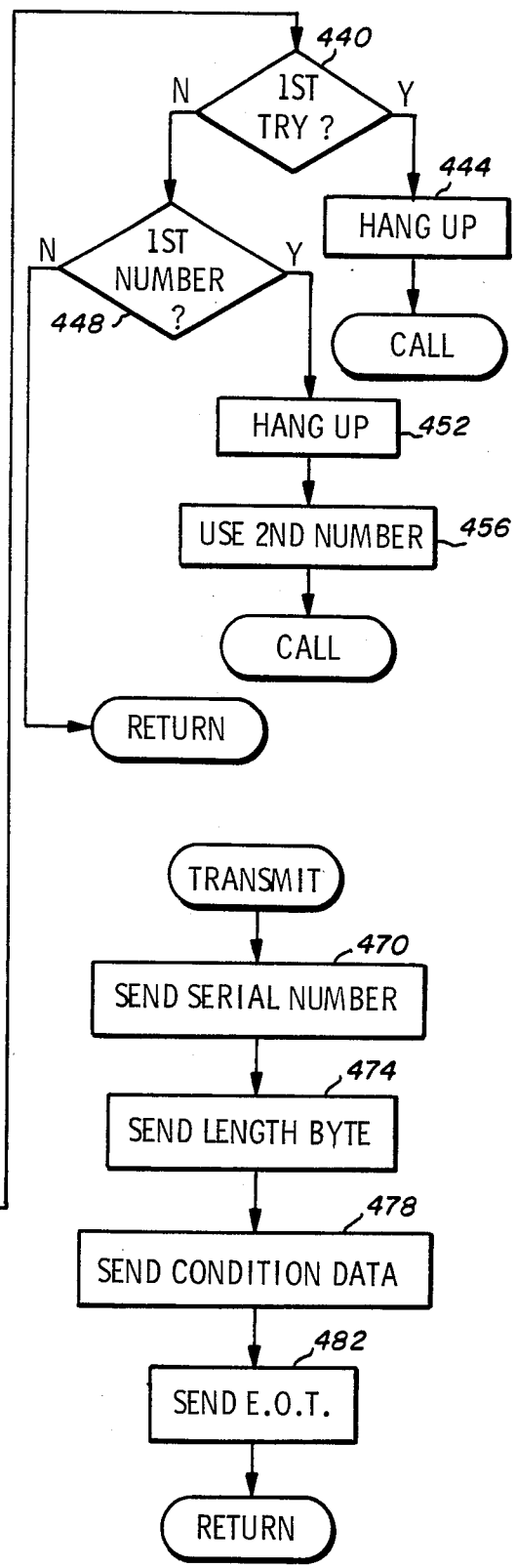
Fig_2D

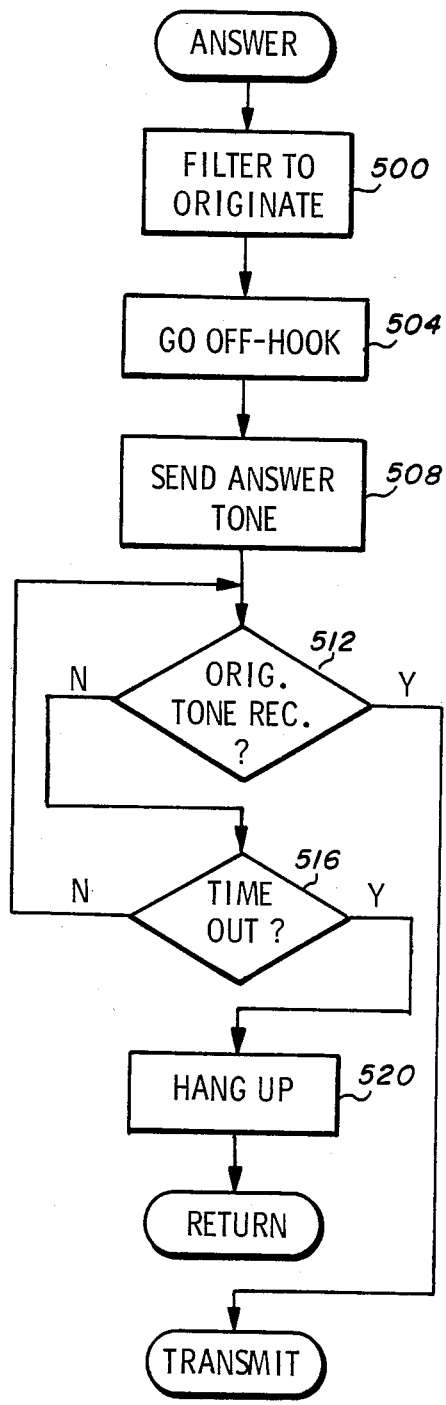
Fig_2E

REMOTE TELEMETRY UNIT

BACKGROUND OF THE INVENTION

1. Field of the Invention

The present invention relates to telephonic apparatus generally and more particularly to a remote-telemetry unit for condition monitoring and reporting, the unit having means by which the unit may be poled.

2. Description of the Prior Art

Heretofore, providing maintenance for office equipment has been an expensive, hit-or-miss proposition. Obviously, routine maintenance may reduce the likelihood of extensive downtime; yet, unnecessary maintenance is expensive. But, absent indices of the condition of a piece of office equipment, it is very difficult to schedule preventative maintenance therefor. Even scheduling meaningful periodic maintenance is difficult absent wear indices, such as, for example, the number of sheets of paper used in a photocopy machine during a particular period of time, especially where the level of machine usage is not constant. And, when a piece of equipment does go down, prompt detection and notification thereof is important to minimize downtime.

A combined burglar-alarm and remote-telemetry unit of prior-art type employs a microcomputer for monitoring a number of switches and sensors and a modem driven by the microcomputer for reporting certain conditions over a telephone line to a central location. The modem includes a direct access arrangement (DAA) for selectively coupling the unit to the telephone line, circuitry for developing suitable dual-tone multi-frequency (DTMF) (touch-tone) tones for dialling, additional circuitry for developing originate tones, circuitry for recognizing answer tones (both of the type which are compatible with Bell 103 protocol) and a power supply for developing unit operating power from a 110-volt power line (system).

The above-mentioned prior-art-type unit is disadvantageous in that the circuitry for developing the dialing tones, for developing the originate tones and for recognizing the answer tones is relatively complex and expensive. Additionally, the unit lacks means by which the unit may ascertain the time and date to permit the unit to determine the number of events (conditions) which occur within a given period of time and to permit the unit to report its status at predetermined times. Also lacking is means permitting the unit to answer telephone calls to be poled to ascertain its status and that of the various switches and sensors monitored thereby. Finally, 110-volt power lines are, oftentimes, not conveniently available either to furnish primary or backup power.

SUMMARY OF THE PRESENT INVENTION

It is therefore a primary object of the present invention to provide a remote-telemetry unit which is simple and inexpensive.

Other objects of the present invention include providing a remote-telemetry unit having means by which the unit may ascertain the time and date and means by which the unit may be poled.

Briefly, the preferred embodiment of a remote-telemetry unit in accordance with the present invention includes a line-busy detector for ascertaining if an associated telephone line is in use, and a direct access arrangement (DAA) having a protective network for selectively seizing the telephone line and coupling signals between the line and the unit and a power supply for developing unit operating power from the potential developed across the telephone line. Also included is an active band-pass filter, the pass band of which is selectively switched to pass either answer or originate tones developed on the telephone line, a level detector for comparing a predetermined level with the instantaneous level of the filtered tones to detect the presence thereof, a digital-to-analog (D/A) converter for converting digital signals to analog tones suitable for driving the protective network, a microcomputer, a display unit and three switches. The microcomputer provides prompts on the display unit and monitors the switches to permit the remote-telemetry unit to be programmed, counts the cycles of a clocking signal to maintain a calendar-clock variable providing the date and time, monitors a number of lines connected to an associated piece of office equipment to ascertain the condition thereof and reports the condition of the equipment at predetermined times, when the condition of the equipment dictates and when poled. When reporting, the microprocessor develops digital signals for conversion by the digital-to-analog (D/A) converter to tones suitable for telephone dialing (when originating a call) and develops digital signals for conversion by the digital-to-analog converter to answer or originate tones suitable for reporting the equipment condition.

Thus, the ability to provide simple and economical remote-telemetry units having the means for ascertaining the date time and means by which the units may be poled are advantages of the present invention.

These and other objects and advantages of the present invention will no doubt be obvious after having read the detailed description of the preferred embodiment illustrated in the figures of the drawing.

IN THE DRAWING

FIG. 1 is a schematic diagram illustrating a remote-telemetry unit in accordance with the present invention; and FIGS. 2A-2E taken together illustrate the various operative states of the remote-telemetry unit shown in FIG. 1.

DETAILED DESCRIPTION OF THE PREFERRED EMBODIMENT

Illustrated in FIG. 1 of the drawing generally designated by the number 10 is the preferred embodiment of a remote-telemetry unit in accordance with the present invention, the unit for use with an associated piece of office equipment such as, for example, a photo-copy machine which is represented by a machine 12. Remote-telemetry unit 10 monitors signals developed by the piece of equipment, machine 12, to ascertain the condition of the equipment and reports the condition thereof over a standard telephone line to a central location. For connection to the telephone line, unit 10 has a cable 20 having a standard RJ11C plug; and, for connection to the piece of equipment, machine 12, unit 10 has a digital (TTL level) bus 22.

Remote-telemetry unit 10 is shown to employ as principal components a line-busy detector 30, a direct(data)-access arrangement (DAA) 32, a switched frequency band-pass filter 36, a level detector 38, a digital-to-analog (D/A) converter 40, a controller 42, a display unit 44 and three normally-open momentary-contact programming switches which are collectively designated 46 and which include a mode switch 48, an alter switch 50 and an increment switch 52.

Line-busy detector 30 includes, as principal components, a bridge rectifier, generally designated 60, an optical isolator 62 and a zener diode 69. Rectifier 60 provides current steering to make the detector 30 operation independent of the cable 20 tip-ring phasing. To this end, the two (AC) input terminals of rectifier 60 are connected to cable 20, one of the terminals being connected to a tip line 66 of the cable and the other being connected to a cable 20 ring line 68. Across the two (DC) output terminals of rectifier 60 is connected the series combination of the two terminals of the input portion of optical isolator 62, zener diode 69 and a current-limiting resistor 70. One of the two terminals of the output portion of optical isolator 62 is connected to controller 42 by a line 72 and coupled by a pull-up resistor 74 to a positive (TTL level) power-supply potential, the other terminal being connected to circuit ground. Diode 69 has a zener potential which permits a current flow through the diode and the input portion of optical isolator 62 when an on-hook potential is developed between tip line 66 and ring line 68 and which blocks such current flow when an off-hook potential is developed between the lines. Consequently, resistor 74 develops a high (TTL) logic-level potential on line 72 when an off-hook potential is developed between tip and ring lines 66 and 68, in other words when the telephone line is busy (in use).

Direct-access arrangement (DAA) 32 includes a protective network coupler or circuit 80 and a power supply 82. Protective network 80 is responsive to a ring signal developed on cable 20 and operative to develop a (TTL) logic-level signal on a line 90 for driving controller 42. Further, circuitry 80 is responsive to a (TTL) logic-level signal developed by controller 42 on a line 92 and operative to seize (per standard telephone protocol) (i.e., go off-hook) the telephone line connected to cable 20. Following seizure of the telephone line, circuitry 80 couples to the tip line of cable 20, with respect to the ring line thereof, (AC) signals developed by digital-to-analog (D/A) converter 40 between a line 94 and circuit ground and couples (AC) signals developed between the tip and ring lines of cable 20 to a line 96, with respect to circuit ground, for driving filter 36.

Power supply 82 develops remote-telemetry unit 10 operating power (at the TTL power-supply-potential level) from the various potentials developed between the tip and ring lines of cable 20, including the on-hook and the off-hook potentials developed therebetween.

Preferably, direct-access arrangement (DAA) 32 is of the type which is designated CH1812 by Cermetek Inc. In an alternative embodiment, direct-access arrangement 32 is of the (FCC part approved) type which is designated CH1810 by Cermetek Inc. Alternatively, power supply 82 includes conventional batteries and/or a power supply of the type which develops remote-telemetry unit 10 operating power from a 110-volt power line (system).

Switched-frequency band-pass filter 36 includes a band-pass filter 100 and a center-frequency switch 102. In addition to an operational amplifier 106, filter 100 has three potential dividers each driven by the signal developed by protective network 80 on line 96. One divider includes a resistor 108 connected between line 96 and a node 110, another resistor 112 connected between node 110 and a line 114 and an additional resistor 116 connected between line 114 and circuit ground. The second divider includes a pair of resistors 118 and 120, resistor 118 being connected between line 96 and the inverting input of amplifier 106 and resistor 120 being connected between the inverting input and circuit ground. The third divider includes a resistor 122 connected between line 96 and the non-inverting input of amplifier 106 and a resistor 124 connected between the non-inverting input and circuit ground. Filter 100 also has as a coupling element, a capacitor 126 connected between node 110 and the inverting input of amplifier 106. Further filter 100 has three feedback elements including a capacitor 130 connected between the output of amplifier 106 and node 110, a resistor 132 connected between the amplifier output and the inverting input of the amplifier and a resistor 134 connected between the output and the non-inverting input of the amplifier. The output of amplifier 106 is connected to level detector 38 by a line 136.

The principal difference between band-pass filter 100 and band-pass filters of the type commonly referred to as Friend Biquad filters is that instead of employing a single resistor connected between node 110 and circuit ground, filter 100 employs a pair of resistors, specifically resistors 112 and 116, series connected between node 110 and circuit ground to provide a tap at their junction for connection to line 114 and switch 102. It is important to note that the resistive impedance between node 110 and circuit ground controls, at least in part, the center frequency of filter 100.

Center-frequency switch 102 has a switching transistor 142 the base of which is coupled by a current-limiting resistor 144 to a line 146 to be driven by controller 42. The emitter of the transistor is connected to circuit ground; and, the collector of the transistor is connected to line 114. Transistor 142 is responsive to the signal developed by controller 42 on line 146 and operative to selectively bypass resistor 116 to selectively switch the center frequency of band-pass filter 100 between a frequency chosen to pass (Bell 103) originate frequencies while rejecting (Bell 103 ) answer frequencies and vice versa.

Level detector 38 includes a comparator 150 having an input coupled to line 136 by an (AC) coupling capacitor 152 to receive the signal developed by filter 36 and coupled to circuit ground by a biasing resistor 154, another input connected to the juncture of a pair of resistors 156 and 158 which are series connected between a (TTL-level) power-supply potential and circuit ground to receive a reference potential developed by the resistors and an output connected to controller 42 by a line 160. Detector 38 is operative to compare the instantaneous level of the signal developed by filter 36 on line 136 with respect to the level of the reference potential developed by resistor 156 and 158 to develop on line 160 a controller 42 driving signal which delineates the periods during which the instantaneous level of the filtered signal exceeds the level of the reference potential.

Digital-to-analog (D/A) converter 40 includes an operational amplifier 170 having a non-inverting input coupled by each of six resistors which are designated 174–178, inclusive, and which have binary weighted impedances, to a respective one of six lines which form a bus 172, the bus being driven by digital signals developed by controller 42. Additionally, amplifier 170 has a non-inverting input connected to the juncture of a pair of resistors 180 and 182 series connected between a (TTL-level) power-supply potential and circuit ground, to receive a reference potential developed by the resistors. Finally, amplifier 170 has an output coupled to the inverting input of the amplifier by a feedback resistor 184 and coupled to line 94 by an (AC) coupling (DC-blocking) capacitor 186. Converter 40 combines, in binary weighted fashion, the digital signals developed by controller 42 on bus 172 to develop, at the amplifier output, a corresponding potential level, which is (AC) coupled to line 94 to drive protective network 80.

Controller 42 includes a combined oscillator and clock circuit designated 200, a central processing unit (CPU) 204 driven by the oscillator and clock circuit, a timer-event counter 206 for counting cycles of a signal developed by the oscillator and clock circuit to provide a means by which the central processing unit may measure the passage of time. Additionally, controller 42 has a read only memory (ROM) 208 storing instructions for execution by central processing unit 204, a random access memory (RAM) 210 for the storage of variables by the central processing unit and an input/output (I/O) unit 212 to provide a means by which the central processing unit may monitor the digital level of and/or control the digital level of signals developed on a number of lines connected thereto. Specifically, for input, input/output unit 212 of controller 42 is connected to line 72 to receive the signal which indicates whether the telephone line is busy, to line 90 to receive the signal which indicates whether a ring signal is being developed on the telephone line, to line 160 to receive the signal which indicates whether an answer or originate tone is being received and to three lines including a line 116 the potential on which is selectively shorted to circuit ground by mode switch 48, a line 218 the potential on which is selectively shorted to circuit ground by alter switch 50 and a line 220 the potential on which is selectively shorted to circuit ground by increment switch 52. For output, input/output unit 208 of controller 42 is connected to the five lines of bus 72 for driving digital-to-analog (D/A) converter 40, to line 92 for causing protective network 80 to seize the telephone line (go off-hook) and to three lines, designated 222, 224 and 226, for driving display unit 44. Additionally, input/output unit 208 of controller 42 is connected to bus 22. Bus 22 includes a line upon which the controller receives an (office-equipment-developed) 60-hertz timing signal (when such a signal is available), a line upon which the controller receives a controller-interrupting emergency signal which indicates the need for immediate condition reporting, seven lines upon which controller 42 develops (office-equipment condition) addressing signals, a line upon which the controller develops a read (not) strobe signal for indicating when the addressing signals are valid, and eight lines upon which the controller receives addressed condition signals (developed by the office equipment). Depending upon the selection of an option during programming, the seven address and eight data lines alternatively serve to receive office equipment information in serial format. In this format, one of the seven address lines serves as a transmit data line; and another serves as a data transmit ready line. Three of the eight data lines are employed, respectively, as a data carrier detect line, a clear to send line and a data set ready line.

Further, controller 42 has a pair of inputs across which is connected a crystal 230 which is, preferably, of the color-burst type and a reset input which is coupled to circuit ground by a controller-resetting time-constant capacitor 234 and coupled to a (TTL-level) power-supply potential by the parallel combination of a (capacitor-discharging) steering diode 238 and a (capacitor-charging) time-constant capacitor 240.

Preferably, controller 42 includes a microcomputing device of the type which is designated 8048 by the Intel Corporation. The various operative states of controller 42 are discussed below in conjunction with those of remote-terminal unit 10, which are illustrated in FIGS. 2A–2E.

Display unit 44 displays, in seven-segment format, up to six characters forming a program prompt. The desired state of each of the 42 segments is established in turn responsive to the digital state of the signal developed by controller 42 on line 222 at the time of the clocking transition of the signal developed by controller 42 on line 224. The programmed characters are displayed responsive to the state of the signal developed by controller 42 on line 226. Preferably, display unit 44 includes a module of the type which is referred to as a micro-wire display module by the National Semiconductor Corporation.

The operative state of remote-telemetry unit 10 are illustrated in FIGS. 2A–2E. With concurrent reference to FIGS. 1 and 2A, the operative states are shown to include those which are represented by a block 310 (shown in FIG. 2A), states which are associated with periodically ascertaining the state of each of the signals developed on lines 216, 218 and 220 (shown in FIG. 1) to detect the closure of each of programming switches 46. The operative states associated with programming unit 10 are described below in conjunction with FIG. 2B. Among the other operative states of remote-telemetry unit 10 are those which are associated with maintaining a variable as a calendar-clock, these later states being represented by a block 314. Specifically, controller 42 periodically monitors the state of the 60-hertz signal developed on the respective line of bus 22 and, responsive to changes therein, increments the calendar-clock variable as appropriate. In the absence of the 60-hertz signal, controller 42 increments the calendar-clock variable, as appropriate, responsive to cycles of oscillator and clock circuit 200 driven timer/event counter 206.

Following incrementation of the calendar-clock variable, as illustrated by a block 318, the variable is compared with one employed to store the next date and time at which remote-telemetry unit 10 is to report the condition of the associated piece of office equipment (represented by machine 12). The operative state associated with condition reporting at predetermined times or reporting responsive to a controller 42 interrupting emergency signal developed on the respective line of bus 22 are described below in conjunction with FIGS. 2C and 2D.

Additionally, as indicated at 322, controller 42 periodically ascertains the state of the signal developed by protective network 80 on line 90 to ascertain if a ring signal is being developed on (the telephone line connected to) cable 20. The operative state associated with condition reporting responsive to a ring signal (in other words, when poled) are described below in conjunction with FIGS. 2D and 2E.

The operative states associated with programming remote-telemetry unit 10 are illustrated in FIG. 2B. Initially, as indicated by a block 350 (shown in FIG. 2B), controller 42 (shown in FIG. 1) causes a suitable prompt to be displayed on display unit 44 and flashes a particular one of the characters as will become apparent shortly. Such prompts include, for example, for programming the calendar portion of the calendar-clock variable, a small letter "d" as a display designating character, a blank, two digits representing the month and two digits representing the day; for the clock portion of the calendar-clock variable, a capital letter "C" as a display designating character, a blank, two digits representing the hour and two digits representing the minutes; for the telephone numbers, a capital "L", a digit indicating whether the telephone number is a primary or secondary number, and a four-digit telephone number window of the up to 20 possible digits of each number; for a unit identifying serial number, a capital "S", a blank and four serial number digits; for on/off either/or options, a capital "O", and five digits representing various options in hex format; and to monitor the parallel port lines, a capital "P", two digits representing, in hex format, address signals developed on the address lines of cable 22 and two digits representing the responsive signals developed on the data line of cable 22, also in hex format.

With continued reference to FIGS. 1 and 2B, after displaying a prompt and flashing a character thereof, controller 42 ascertains whether mode switch 48 is closed, as indicated by the block at 354. Responsive to each closure thereof, controller 42 causes the next programming prompt to be displayed to step through the various prompts in sequence, as indicated at 358. At 364, controller 42 determines if alter switch 50 is closed and, if closed, flashes the next character of the prompt displayed, to step through the various alterable characters as indicated at 368. Finally, if controller 42 ascertains, at 372, that increment switch 52 is closed, the controller increments the flashing digit, as indicated at 376.

FIGS. 2C and 2D illustrate the operative state for condition reporting at predetermined times or responsive to a controller 42 interrupting signal developed on a respective line of bus 22 (both shown in FIG. 1). Specifically, as indicated at 400 (in FIG. 2C), controller 42 develops a signal on line 146 (shown in FIG. 1) of suitable state so as to switch the center frequency of filter 36 to pass answer tones. Next, as indicated at 404, controller 42 ascertains the state of the signal developed on line 72 by line-busy detector 30 to determine if the telephone line connected to cable 20 is in use (busy) and waits until the telephone line is not in use. When the telephone line is not busy, controller 42 develops on line 92 a signal of suitable state to cause protective network 80 to seize the telephone line (go off-hook), as indicated at 408.

Rather than detect the presence of a dial-tone signal the telephone line, controller 42, at 412, waits an appropriate period of time, preferably two seconds, to insure the presence of such a signal. Next, at 416, depending upon the pre-programmed dialing option, controller 42 either tone or pulse dials a first of a pair of predetermined telephone numbers employed for condition reporting. For tone dialing, at 420, controller 42 develops on bus 172 digital signals which when converted to analog format by digital-to-analog (D/A) converter 40 results in the generation of the appropriate dual-tone multi-frequency (DTMF)(touch-tone) signals on the telephone line. Alternatively, at 424, controller 42 pulses the signal developed on line 92 so as to cause protective network 80 to appropriately interrupt the telephone line tip to ring current to dial the telephone number in pulse (rotary dial) fashion.

After dialing, controller 42, at 428, develops on bus 172 digital signals which when converted by digital-to-analog (D/A) converter 40 results in the generation of a (Bell 103) originate tone on the telephone line. Concurrently, controller 42 monitors the state of the signal developed by level detector 38 on line 160 to detect the presence of a (Bell 103) answer-tone signal developed on the telephone line by ascertaining the total period that the signal developed on line 136 exceeds the reference level during a predetermined period, preferably 100 milliseconds. Should no such tone signal be detected at 432 and 436 within a predetermined period, preferably 17 seconds, controller 42 tries again, as indicated at 440 and 444. Should proper contact not be established within two tries, controller 42 tries twice the alternate telephone number, as indicated at 448, 452 and 456.

Turning to FIG. 2D, after contact is established, controller 42 (shown in FIG. 1) transmits the office-equipment generated condition data preferably at a rate of 300 baud. First, as indicated at 470, three bytes representing the serial number of the particular remote-telemetry unit is transmitted. Next, at 474, a byte is transmitted which indicates the length of the condition data to follow. Thereafter, at 478, the condition data is transmitted followed by an end of text (EOT) byte, at 482.

When the condition data is sent to remote-telemetry unit 10 by the associated piece of office equipment (machine 12) in parallel format, the unit transmits the data in a 10-bit asynchronous start/stop format. When the serial option has been selected for transmission of condition data to remote-telemetry unit 10 by the equipment, the unit transmits the condition data in the same format in which the data is received.

The operative states associated with condition reporting when poled are illustrated in FIGS. 2D and 2E. With reference to FIGS. 1 and 2E, controller 42 switches filter 36 to pass originate-tone signals, causes protective network 80 to size the telephone line (go off-hook) and generates signals causing digital-to-analog (D/A) converter 40 to generate an answer-tone signal on the telephone line as indicated at 500, 504 and 508, respectively. While generating the answer-tone signal, controller 42 waits for an originate-tone signal to be developed on the telephone line. If no such tone signal is developed within a predetermined period, preferably 17 seconds, controller 42 causes protective network 80 to hang up, as indicated at 512, 516 and 520, respectively.

Although, in the preferred embodiment, it is intended that remote-telemetry units in accordance with the present invention be employed for reporting the condition of an associated piece of office equipment, other applications are contemplated. For example, remote-telemetry units in accordance with the present invention may be employed to monitor and report the condition of various burglar alarm switches. Additionally, remote-telemetry units in accordance with the present invention may be employed with a power consumption meter to report to a power utility electrical power usage.

It is anticipated that after having read the preceding disclosure certain alterations and modifications of the present invention will no doubt become obvious to those skilled in the art. It is therefore intended that the following claims be interpreted to include all such alterations and modifications as which fall within the true spirit and scope of the invention.

What is claimed is:

1. A remote-telemetry unit for reporting the state of at least one signal developed by an associated piece of equipment to a remote location over a telephone line, the unit comprising in combination:

digital-to-analog-converting means responsive to a plurality of digital-to-analog-converting-means-driving digital signals and operative to generate a corresponding analog signal;

filter means having a state in which said filter means passes originate-tone signals and rejects answer-tone signals and a state in which said filter means passes answer-tone signals and rejects originate-tone signals, said filter means being responsive to a filter-means-controlling signal and operative to switch between said states;

protective-network means having an on-hook state in which said protective-network means develops a ring-signal-indicating signal when a ring signal is developed on the telephone line and an off-hook state in which said protective-network means permits an off-hook current to flow through said telephone line, couples said digital-to-analog-converting means developed analog signals to said telephone line and couples signals developed on said telephone line to said filter means, said protective-network means being responsive to a protective-network-means-controlling signal and operative to switch between said on-hook and said off-hook states;

detector means connected to said filter means, said detector means for detecting tone signals which are generated on said telephone line and which are passed by said filter means and for developing a tone-signal-detected signal; and controller means for receiving the signal developed by the associated piece of equipment, for generating said digital-to-analog-converting-means-driving digital signals, for generating said filter-means-controlling signal, for receiving said ring-signal-indicating signal, for generating said protective-network-means-controlling signal and for receiving said tone-signal-detected signal, said controller means including means by which said controller means may measure the passage of time, said controller means being operative at a predetermined time to perform an originate report sequence in which said controller means generates said filter-means-controlling signal so as to cause said filter means to switch to the state in which said filter means passes answer-tone signals, generates said protective-network-means-controlling signal so as to cause said protective-network means to switch to said off-hook state, generates said digital-to-analog-converting-means-driving digital signals so as to cause said digital-to-analog-converting means to develop on said telephone line a sequence of signals suitable for dialing the remote location, and upon receipt of said tone-signal-detected signal generates said digital-to-analog-converting-means-driving digital signals so as to cause said digital-to-analog-converting means to develop on said telephone line a sequence of signals suitable for indicating the state of said associated equipment developed signal, and said controller means being responsive to said ring-signal-indicating signal and operative to perform an answer report sequence in which said controller means generates said filter-means-controlling signal so as to cause said filter means to switch to the state in which said filter means passes originate-tone signals, generates said protective-network-means-controlling signal so as to cause said protective-network means to switch to said off-hook state, and upon receipt of said tone-signal-detected signal generates said digital-to-analog-converting-means-driving digital signals so as to cause said digital-to-analog-converting means to develop on said telephone line said associated equipment signal state indicating sequence of signals.

2. A remote-telemetry unit as recited in claim 1 wherein said associated piece of equipment additionally develops an emergency signal and wherein said controller means is further responsive to said emergency signal and operative to perform said originate report sequence.

3. A remote-telemetry unit as recited in claim 1 further comprising power-supply means for developing a remote-telemetry-unit-operating potential from potentials developed on said telephone line.

4. A remote-telemetry unit as recited in claim 1 wherein said filter means includes a band-pass filter derived from a Friend Biquad filter.

5. A remote-telemetry unit as recited in claim 1 further comprising line-busy-detecting means for determining whether said telephone line is in use and for developing a line-busy signal and wherein said controller means is responsive to said line-busy signal during said originate report sequence and operative to wait until said telephone line is not in use before causing said protective-network means to switch to said off-hook state.

6. A remote-telemetry unit as recited in claim 5 wherein said associated piece of equipment additionally develops an emergency signal and wherein said controller means is further responsive to said emergency signal and operative to perform said originate report sequence.

7. A remote-telemetry unit as recited in claim 6 further comprising power-supply means for developing a remote-telemetry-unit-operating potential from potentials developed on said telephone line.

8. A remote-telemetry unit as recited in claim 7 wherein said filter means includes a band-pass filter derived from a Friend Biquad filter.

* * * * *